United States Patent
Bliven et al.

(10) Patent No.: US 7,345,886 B2
(45) Date of Patent: Mar. 18, 2008

(54) ELECTRONIC DEVICE ENCLOSURE WITH SLIDING AND PIVOTING DOORS

(75) Inventors: Robert P. Bliven, Saratoga, CA (US); Mark Flynn, San Jose, CA (US); Jacques L. Gagne, Los Gatos, CA (US); Raymond L. Gradwohl, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 234 days.

(21) Appl. No.: 11/096,824

(22) Filed: Apr. 1, 2005

(65) Prior Publication Data

US 2006/0221580 A1 Oct. 5, 2006

(51) Int. Cl.
*H05K 5/00* (2006.01)

(52) U.S. Cl. .................. 361/727; 312/223.2; 49/104
(58) Field of Classification Search ........ 361/724–727; 312/223.1, 223.2, 223.3, 322, 329, 139.1; 49/104, 107, 114
See application file for complete search history.

(56) References Cited

U.S. PATENT DOCUMENTS

| | | | | |
|---|---|---|---|---|
| 2,631,077 A | * | 3/1953 | Clingman | 312/8.16 |
| 3,456,995 A | * | 7/1969 | Nyquist | 312/322 |
| 5,083,847 A | * | 1/1992 | Peters | 312/322 |
| 5,108,165 A | | 4/1992 | Rorke et al. | |
| D364,148 S | * | 11/1995 | Jasinski et al. | D14/349 |
| D366,250 S | * | 1/1996 | Connors et al. | D14/354 |
| 5,781,408 A | * | 7/1998 | Crane et al. | 361/724 |
| 5,816,672 A | * | 10/1998 | LaPointe et al. | 312/223.2 |
| 5,959,841 A | | 9/1999 | Allen et al. | |
| 5,975,735 A | | 11/1999 | Schmitt | |
| 6,132,019 A | * | 10/2000 | Kim et al. | 312/223.2 |
| 6,282,770 B1 | | 9/2001 | Lyon | |
| 6,452,788 B1 | * | 9/2002 | Crowley | 312/223.2 |
| 6,603,655 B2 | * | 8/2003 | Hrehor et al. | 361/725 |
| 6,994,410 B2 | * | 2/2006 | Hogan | 312/322 |
| 7,016,191 B2 | * | 3/2006 | Miyamoto et al. | 361/724 |
| 2002/0084727 A1 | * | 7/2002 | Miller | 312/139.2 |

FOREIGN PATENT DOCUMENTS

WO WO-2004/064369 7/2004

\* cited by examiner

*Primary Examiner*—Lisa Lea-Edmonds

(57) ABSTRACT

An electronic device enclosure with sliding and pivoting doors. An opening of the electronic device enclosure provides access to electronic componentry. A first door and a second door are for covering the opening, the first door movably coupled and opposably slidable to the second door such that a single action to open the first door is operable to open the second door by sliding the second door in a substantially opposite direction.

20 Claims, 8 Drawing Sheets

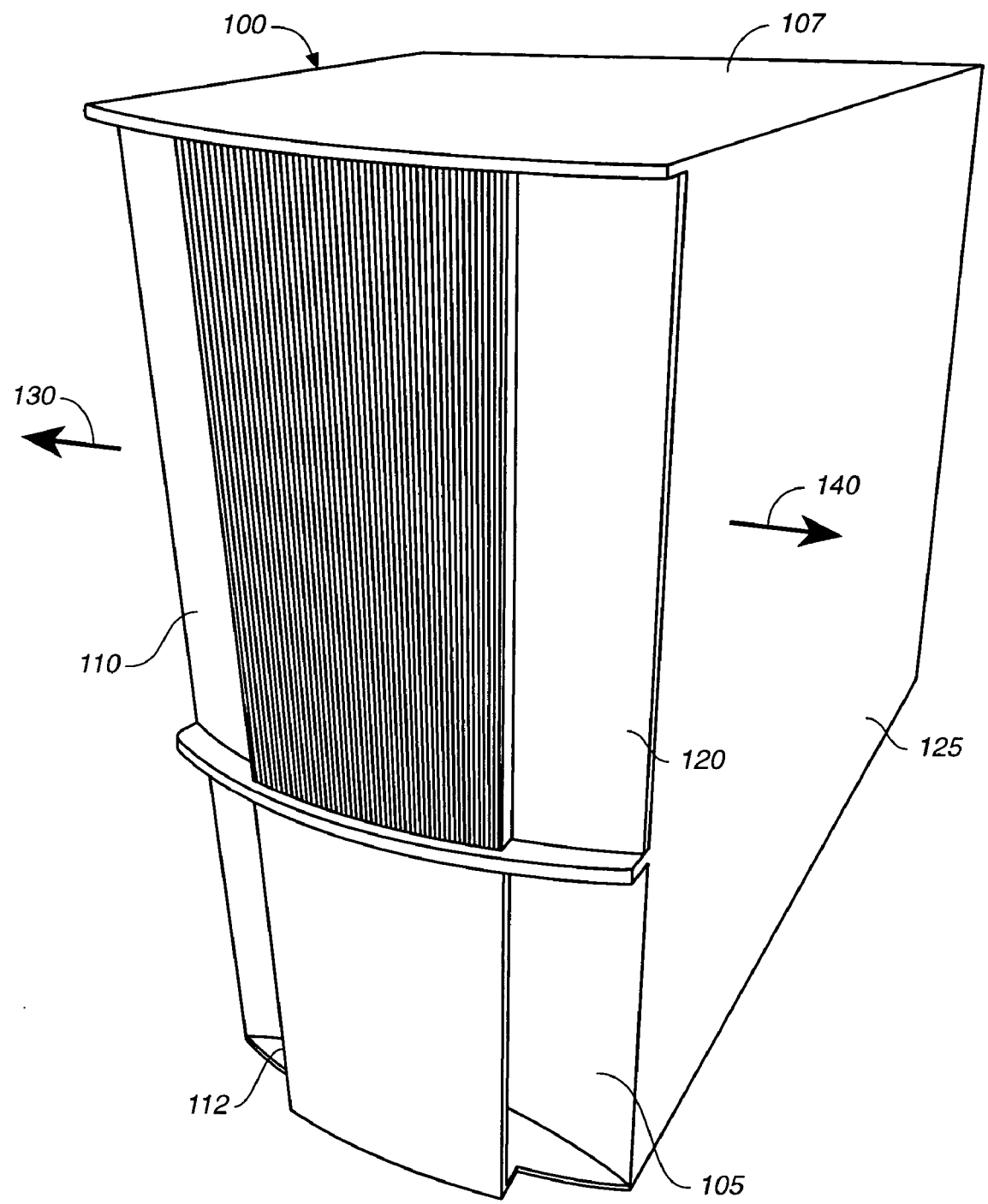
FIG._1

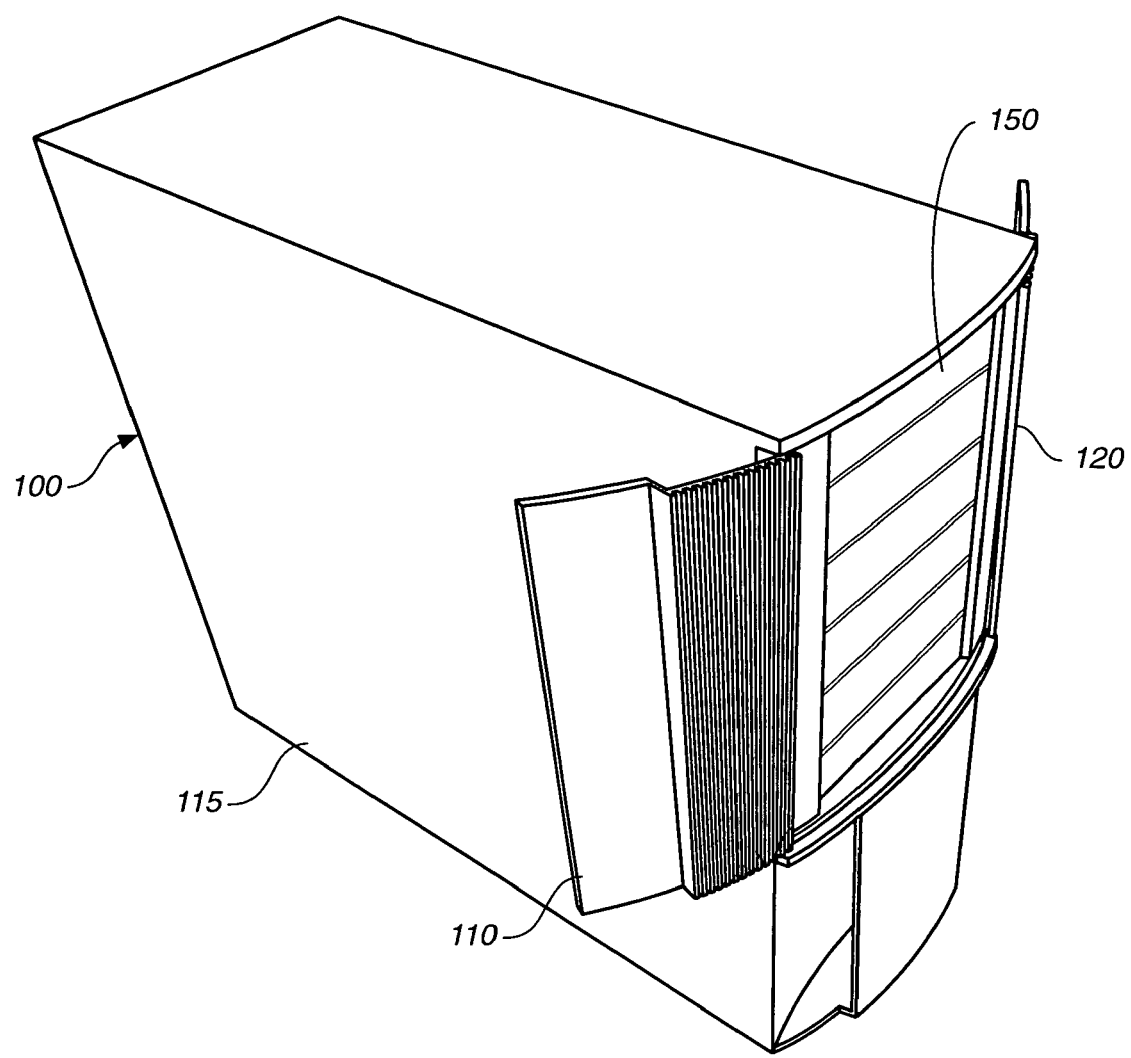
FIG._2A

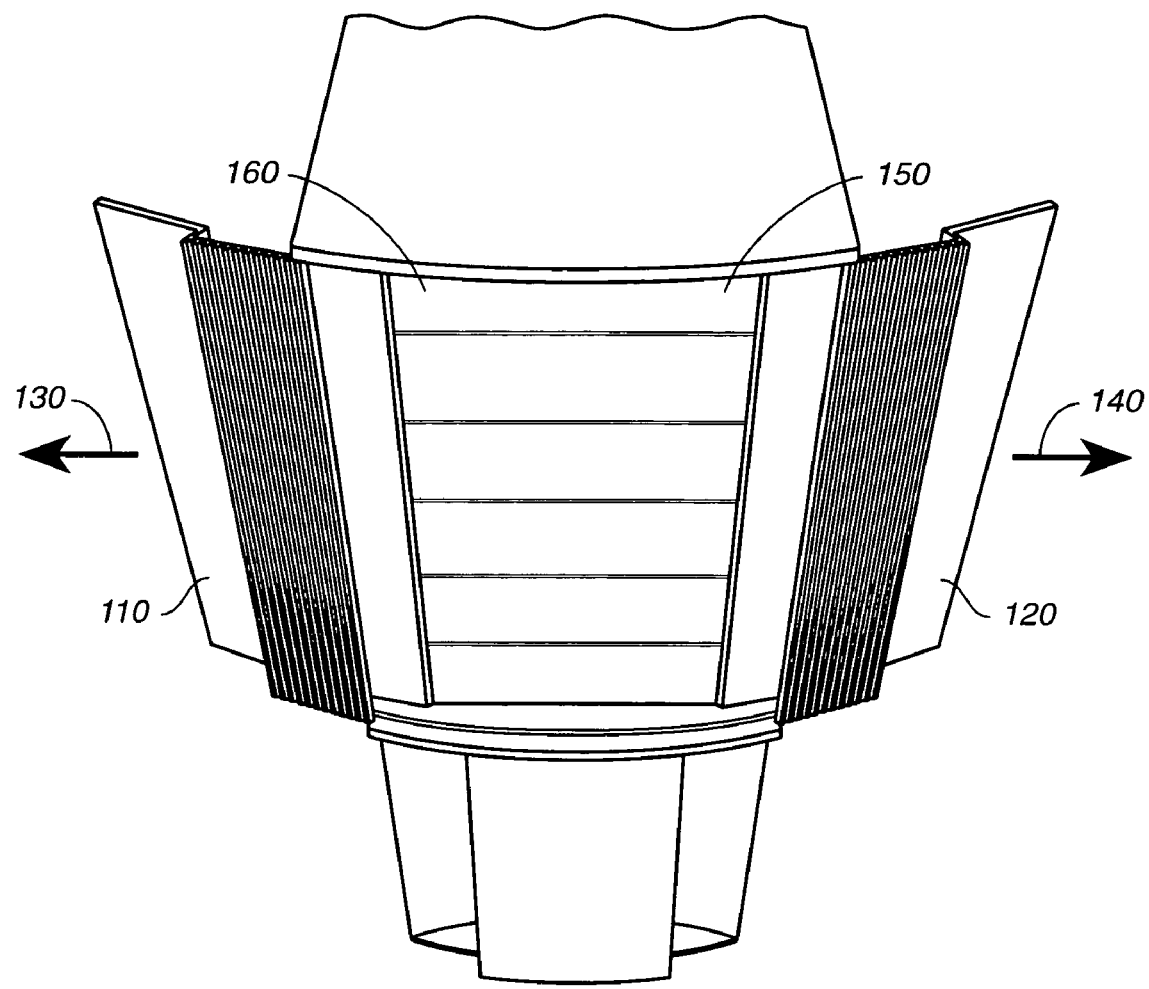
FIG._2B

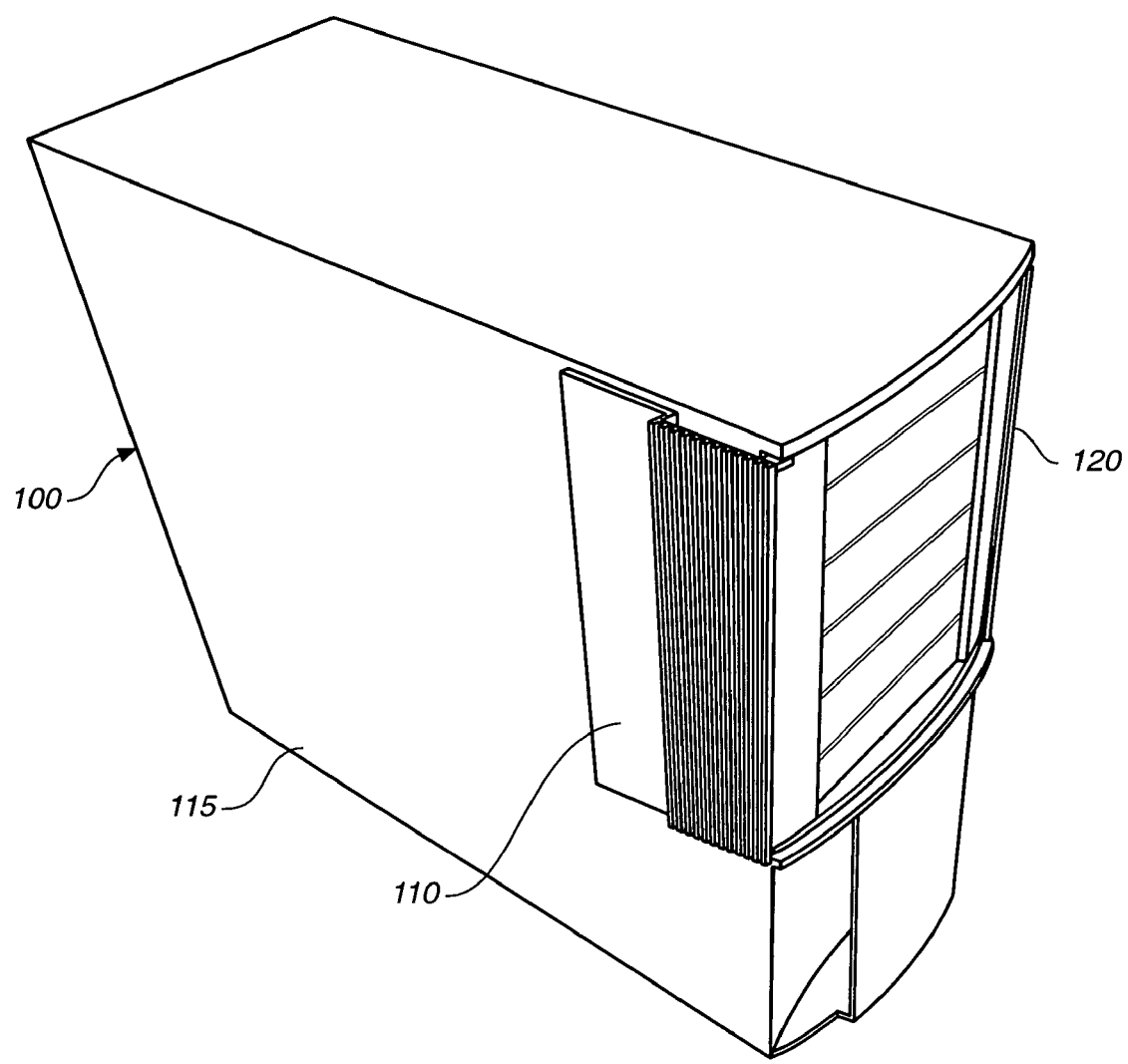
FIG._3A

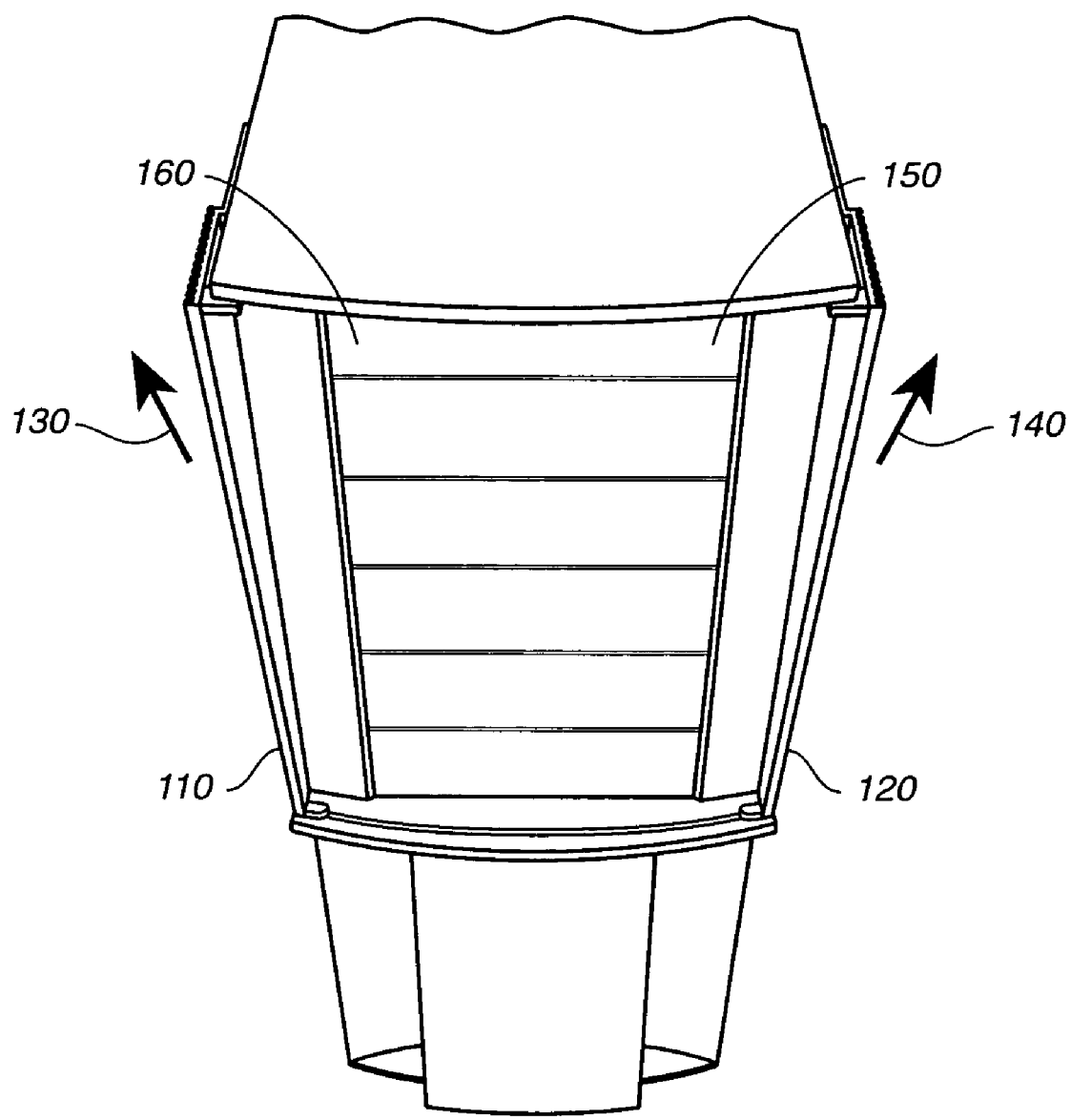
FIG._3B

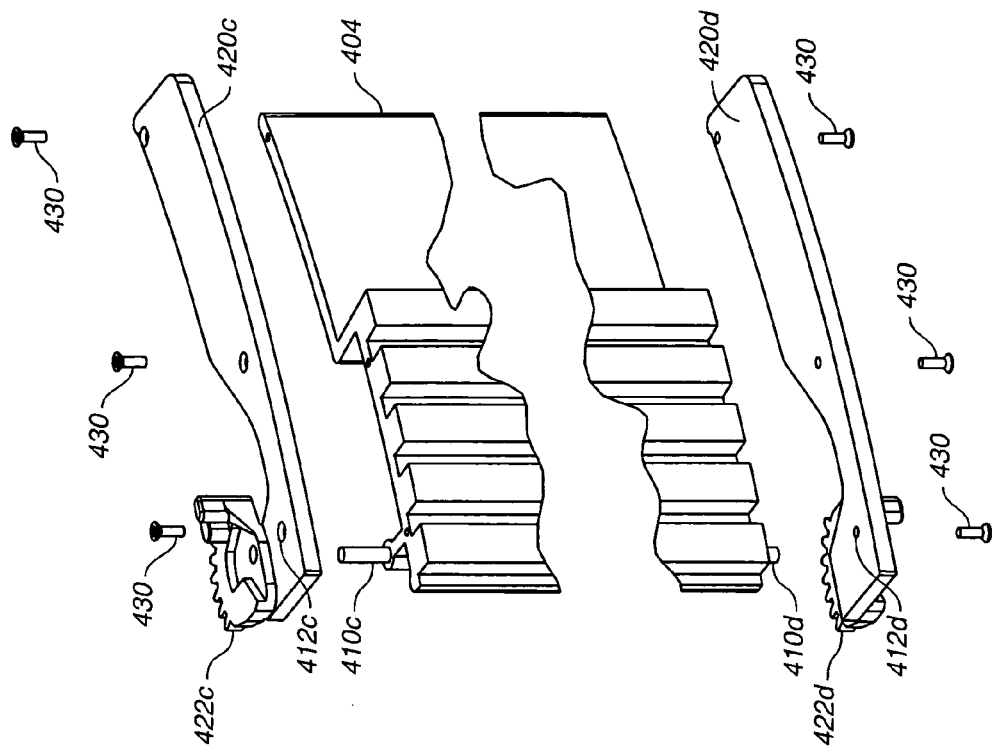
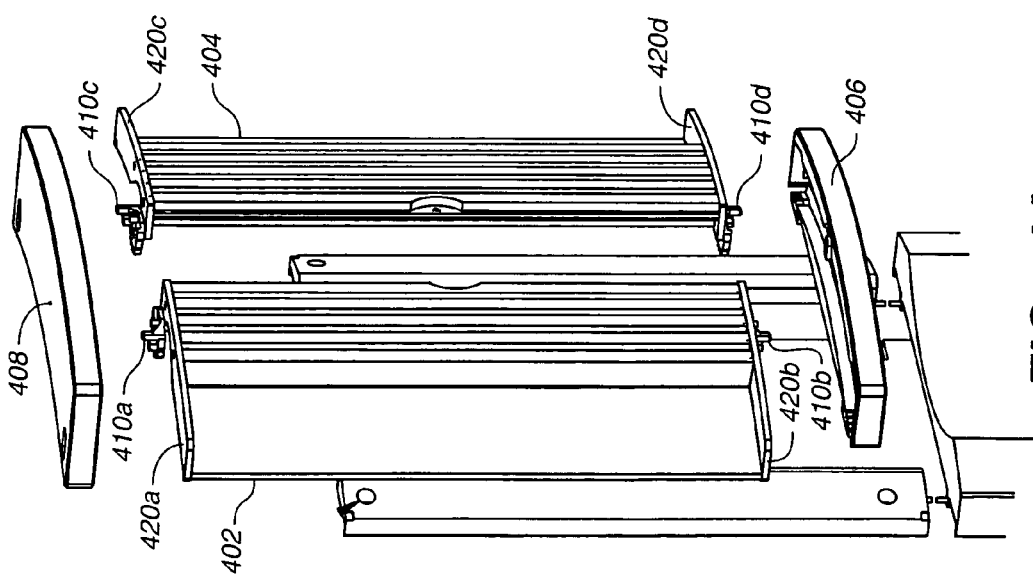

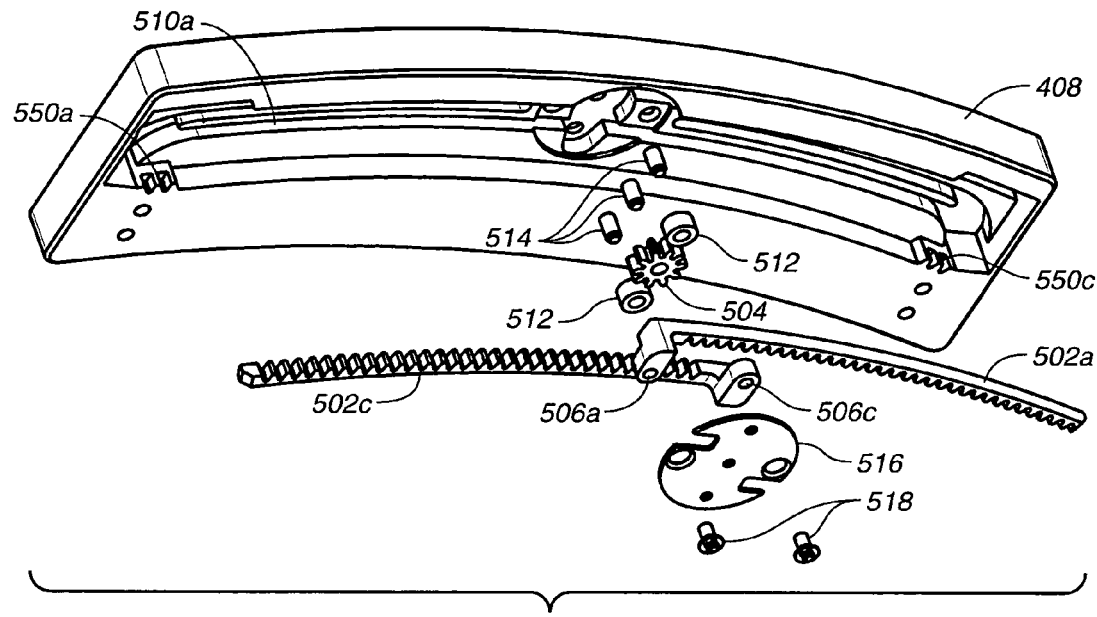
FIG._5A
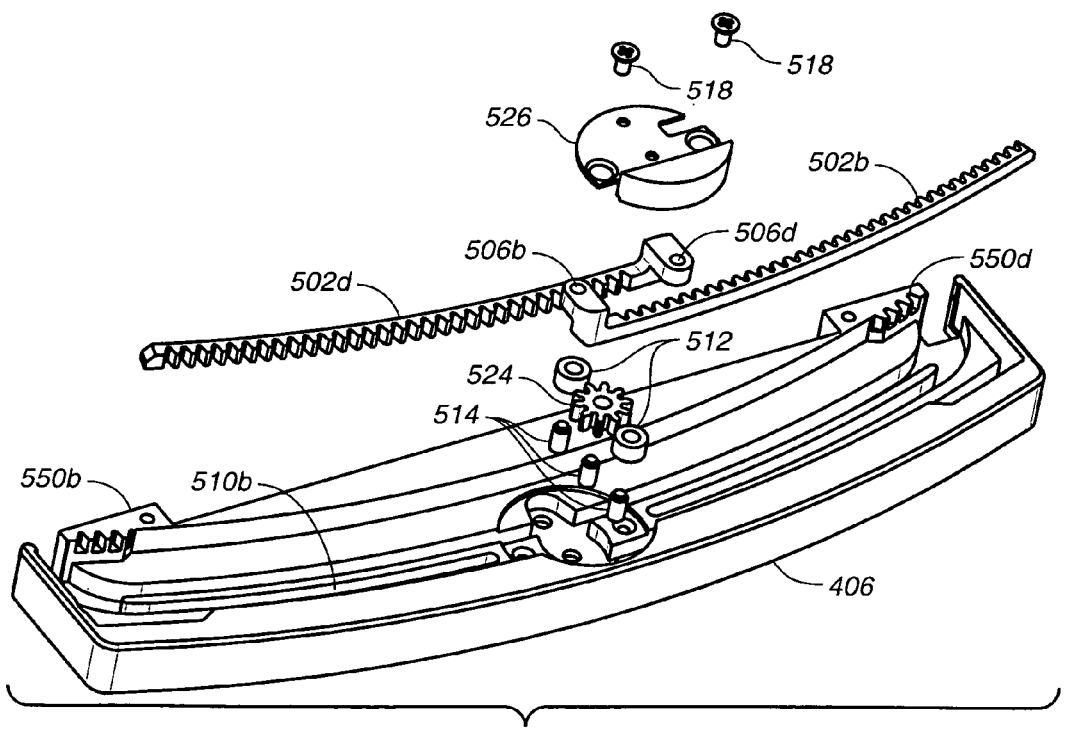
FIG._5B

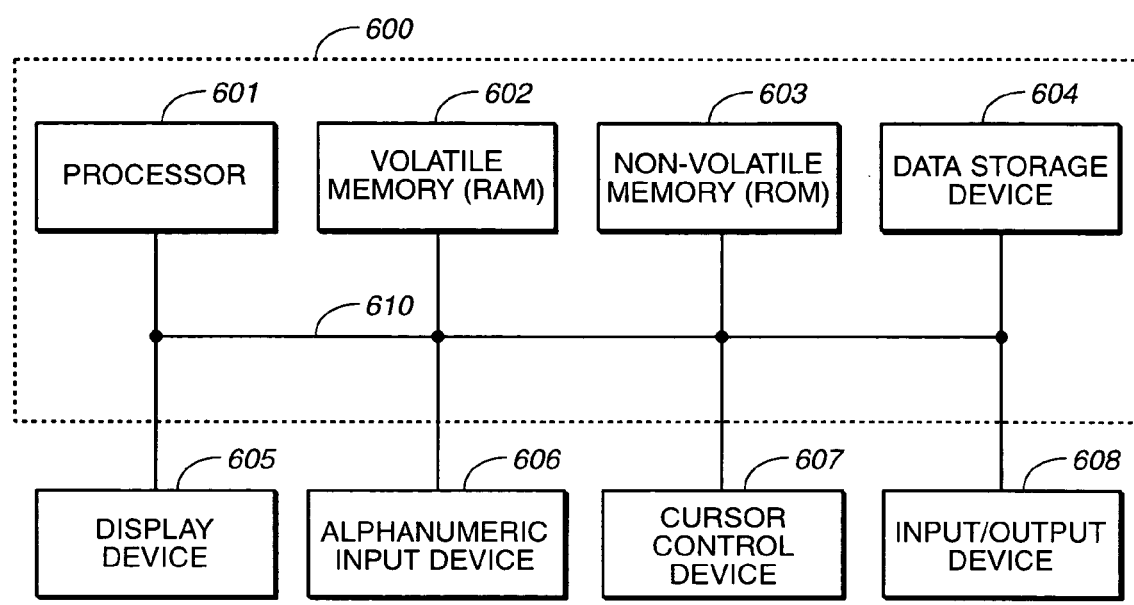
FIG._6

ELECTRONIC DEVICE ENCLOSURE WITH SLIDING AND PIVOTING DOORS

TECHNICAL FIELD

Embodiments of the present invention relate to the field of electronic device enclosures. More specifically, embodiments of the present invention relate to an electronic device enclosure with sliding and pivoting doors.

BACKGROUND ART

Personal computer systems provide many different types of uses for computer users. For example, personal computer systems may be used for Internet/email access, personal financing, personal businesses, gaming, and many other uses. While many uses require minimal computing resources, avid computer gamers typically use the most modern and cutting edge technology available. These users typically use high-end gaming systems to maximize the user experience of the game they are playing.

Often, avid computer gamers transport their personal computer system in order to access off-site local area network (LAN) parties. In moving their computers, the protection of accessible electronic componentry, such as disk drives, is a considerable concern. Currently, computer housing manufacturers provide protection to the accessible electronic componentry by providing a door to cover the componentry. Current doors of computer system housings suffer from aesthetic and function drawbacks.

There are many different types of computer system housings that have doors for covering disk drives. One type of door is a full-width pivoting door that is the entire width of the computer system housing. Typically, these doors are very wide, and are inevitably in the user's way, as they effectively double to width of the housing. Another type of door slides down the front of the housing to reveal the disk drive, but covers up the bottom of the front of the housing, hiding decorative features common in gaming personal computers. The slide down door also often interferes with airflow of vents on the front of the housing. Moreover, typical computer system housing having doors lack the pleasing aesthetic appearance the avid garners often desire.

Moreover, gaming computer system housings often include decorative features. These features are often incorporate into the venting of the housing, so as to provide adequate airflow to the internal components of the computer system. Airflow is essential to the performance of a personal computer system, and particularly important to high-end gaming computer systems, which typically utilize high performance, and hotter running, components. Therefore, it would be desirable to have a computer system housing that protects accessible componentry while providing an aesthetically pleasing appearance.

DISCLOSURE OF THE INVENTION

Various embodiments of the present invention, an electronic device enclosure with sliding and pivoting doors, are described herein. In one embodiment, an opening of the electronic device enclosure provides access to electronic componentry. A first door and a second door are for covering the opening, the first door movably coupled and opposably slidable to the second door such that a single action to open the first door is operable to open the second door by sliding the second door in a substantially opposite direction.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a right side perspective diagram of an exemplary computer system housing with two doors in a closed position, in accordance with an embodiment of the present invention.

FIG. 2A is a left side perspective diagram of an exemplary computer system housing with two doors in an open position, in accordance with an embodiment of the present invention.

FIG. 2B is a top down perspective diagram of an exemplary computer system housing with two doors in an open position, in accordance with an embodiment of the present invention.

FIG. 3A is a left side perspective diagram of an exemplary computer system housing with two doors in an open and pivoted position, in accordance with an embodiment of the present invention.

FIG. 3B is a top down perspective diagram of an exemplary computer system housing with two doors in an open and pivoted position, in accordance with an embodiment of the present invention.

FIG. 4A is a perspective diagram of two slidable and pivoting doors of a computer system housing, in accordance with an embodiment of the present invention.

FIG. 4B is a perspective diagram of features of one slidable and pivoting door of a computer system housing, in accordance with an embodiment of the present invention.

FIG. 5A is a perspective diagram of an upper slide track assembly of a computer system housing, in accordance with an embodiment of the present invention.

FIG. 5B is a perspective diagram of a lower slide track assembly of a computer system housing, in accordance with an embodiment of the present invention.

FIG. 6 is a block diagram of electronic components of an exemplary computer system platform, in accordance with an embodiment of the present invention.

The drawings referred to in this description should not be understood as being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. In other instances, well known methods, procedures, components, and circuits have not been described in detail as not to unnecessarily obscure aspects of the present invention.

FIG. 1 is a right side perspective diagram of an exemplary computer system housing 100, in accordance with an embodiment of the present invention. As shown, computer system housing 100 includes top panel 107, right side panel 125, left side panel (not shown—see left side panel 115 of FIGS. 2A and 3A), and front panel 105. Computer system housing 100 is operable to house electronic componentry of a computer system (e.g., computer system 600 of FIG. 6). In one embodiment, computer system housing 100 is for housing a computer system chassis. In another embodiment, the computer system chassis is integrated into computer system housing 100. It should be appreciated that the computer system chassis may be a separate component from computer system housing 100, or may be integrated into computer system housing 100.

Front panel 105 includes left door 110 and right door 120 for covering an opening in computer system housing 100. It should be appreciated that the pair of doors may also be referred to herein as a first door and a second door, wherein either the first door or the second door may be referred to as left door 110 or right door 120. The terms left door and right door are used herein for simplicity and understanding. In one embodiment, front panel 105 also includes venting 112, for providing airflow to electronic componentry within computer system housing 100. In one embodiment, the opening is for providing access to electronic componentry of the computer system. As shown in FIG. 1, left door 110 and right door 120 and right door are in a closed position. While in the closed position, left door 110 and right door 120 provide protection to electronic componentry in the opening, and prevents user access to the electronic componentry.

Left door 110 is movably coupled and opposably slidable to right door 120 such that a single action to open one of left door 110 or right door 120 is operable to open the other door by sliding the other door in a substantially opposite direction. For example, a single action by a user to open left door 110, as indicated by arrow 130, is also operable to open right door 120 in the opposite direction, as indicated by arrow 140. Similarly, a single action by a user to open right door 120, as indicated by arrow 140, is also operable to open left door 110 in the opposite direction, as indicated by arrow 130. In other words, a single action to open one door causes the other door to open simultaneously. In one embodiment, the single action is a user pulling one of the doors from a center of the opening to an outer edge of the opening.

FIG. 2A is a left side perspective diagram of computer system housing 100 with left door 110 and right door 120 in an open position, in accordance with an embodiment of the present invention. FIG. 2B is a top down perspective diagram of computer system housing 100 with left door 110 and right door 120 in the open position, in accordance with an embodiment of the present invention. For example, a single action by a user to open left door 110, as indicated by arrow 130, is also operable to open right door 120 in the opposite direction, as indicated by arrow 140, providing user access to electronic component 160 within opening 150. In one embodiment, electronic component 160 is a disk drive within a drive bay. It should be appreciated that electronic component 160 may include various disk drives, including but not limited to CD-ROM drives, floppy disk drives, USB drives, and other removable media drives. It should be appreciated that electronic component 160 may be any type or size of drive (e.g., any 5.25 inch drive or 3.5 inch drive).

In one embodiment, upon sliding a particular distance, left door 110 and right door 120 are operable to pivot. FIG. 3A is a left side perspective diagram of computer system housing 100 with left door 110 and right door 120 in an open and pivoted position, in accordance with an embodiment of the present invention. FIG. 3B is a top down perspective diagram of computer system housing 100 with left door 110 and right door 120 in the open and pivoted position, in accordance with an embodiment of the present invention. For example, a single action by a user to pivot left door 110, as indicated by arrow 130, is also operable to pivot right door 120, as indicated by arrow 140, thereby pivoting left door 110 and right door 120 towards the sides of computer system housing 100. In other words, a single action to pivot one door causes the other door to pivot simultaneously. By pivoting towards the sides of computer system housing 100, left door 110 and right door 120 are minimal appendages of computer system housing 100, minimizing the interference of the left door 110 and right door 120 in accessing electronic components (e.g., electronic component 160) within opening 150. In other words, in the open and pivoted position, the pair of doors tuck into the sides of computer system housing 100 such that the doors are minimal appendages on computer system housing 100. Moreover, pivoting the doors improves the aesthetic appearance of computer system housing 100, minimizing the distraction of the doors.

FIG. 4A is a perspective diagram of two slidable and pivoting doors 402 and 404 of a computer system housing (e.g., computer system housing 100 of FIG. 1), in accordance with an embodiment of the present invention. Left door 402 and right door 404 are movably coupled and opposably slidable to each other. Left door 402 includes upper door component 420a, lower door component 420b, upper slide tab 410a for coupling to an upper rack (e.g., upper rack 502a of FIG. 5A) and lower slide tab 410b coupling to a lower rack (e.g., lower rack 502b of FIG. 5B). Right door 404 includes upper door component 420c, lower door component 420d, upper slide tab 410c for coupling to an upper rack (e.g., upper rack 502c of FIG. 5A) and lower slide tab 410d coupling to a lower rack (e.g., lower rack 502d of FIG. 5B). The upper racks are received at a slide track of upper slide track assembly 408 and the lower racks are received at a slide track of lower slide track assembly 406. In one embodiment, upper slide tab 410a, lower slide tab 410b, upper slide tab 410c, and lower slide tab 410d are the same piece that is coupled to one of left door 402 and right door 404.

FIG. 4B is a perspective diagram of features of the top and bottom of right door 404, in accordance with an embodiment of the present invention. It should be appreciated that left door 402 includes similar components as described in FIG. 4B, and that these components are functionally similar. This configuration for right door 404 is the same as for left door 402; left door 402 is a mirror image of right door 404. In one embodiment, right door 404 is coupled to upper door component 420c and lower door component 420d. In one embodiment, upper door component 420c and lower door component 420d are coupled to right door 404 using connectors 430 (e.g., screws, rivets, brads, etc.) In the present embodiment, upper door component 420c includes opening 412c for receiving upper slide tab 410c, wherein upper slide tab 410c protrudes out from opening 412c. Similarly, lower door component 420d includes opening 412d for receiving lower slide tab 410d, wherein lower slide tab 410d protrudes out from opening 412d. It should be appreciated that in other embodiments, upper door component 420c and lower door component 420d are manufactured as a part of right door 404. In one embodiment, upper door component 420c includes pivot gear 422c and lower door component 420d includes pivot gear 422d.

FIG. 5A is a perspective diagram of upper slide track assembly 408 of a computer system housing, in accordance with an embodiment of the present invention. Upper slide track assembly 408 includes slide track 510a for receiving right door upper rack 502c, left door upper rack 502a, and upper gear 504. In one embodiment, slide track 510a is recessed such that right door upper rack 502c, left door upper rack 502a, and upper gear 504 reside within slide track 510a such that slide track 510a, right door upper rack 502c, and left door upper rack 502a do not extend beyond sides of upper slide track assembly 408. In one embodiment, slide track 510a also is for receiving gear pins 514 and gear followers 512. Upper cover 516 is operable to keep right door upper rack 502c, left door upper rack 502a, and upper gear 504 within slide track 510a. In one embodiment, upper cover 516 is coupled to upper slide track assembly 408 using connectors 518 (e.g., screws, rivets, brads, etc.)

Opening 506c of right door upper rack 502c is rotationally coupled to right door 404 at upper slide tab 410c. Opening 506a of left door upper rack 502a is rotationally coupled to left door 402 at upper slide tab 410a. Upper gear 504 is movably engaged to right door upper rack 502c and left door upper rack 502a, wherein movement on either right door upper rack 502c or left door upper rack 502a causes the other rack to move in the substantially opposite direction. In one embodiment, upper slide track assembly 408 also includes left upper pivot rack 550a and right upper pivot rack 550c.

FIG. 5B is a perspective diagram of a lower slide track assembly 406 of a computer system housing, in accordance with an embodiment of the present invention. Lower slide track assembly 406 includes slide track 510b for receiving right door lower rack 502d, left door lower rack 502b, and lower gear 524. In one embodiment, slide track 510b is recessed such that right door lower rack 502d, left door lower rack 502b, and lower gear 524 reside within slide track 510b such that slide track 510b, right door lower rack 502d, and left door lower rack 502b do not extend beyond sides of lower slide track assembly 406. In one embodiment, slide track 510b also is for receiving gear pins 514 and gear followers 512. Lower cover 526 is operable to keep right door lower rack 502d, left door lower rack 502b, and lower gear 524 within slide track 510b. In one embodiment, lower cover 526 is coupled to lower slide track assembly 406 using connectors 518 (e.g., screws, rivets, brads, etc.)

Opening 506d of right door lower rack 502d is rotationally coupled to right door 404 at lower slide tab 410d. Opening 506b of left door lower rack 502b is rotationally coupled to left door 402 at lower slide tab 410b. Lower gear 524 is movably engaged to right door lower rack 502d and left door lower rack 502b, wherein movement on either right door lower rack 502d or left door lower rack 502b causes the other rack to move in the substantially opposite direction. In one embodiment, lower slide track assembly 406 also includes left lower pivot rack 550b and right lower pivot rack 550d.

With reference to FIGS. 4A, 4B, 5A and 5B, the operation of the sliding and pivoting is described. A single action to open right door 404 by moving right door 404 to the right is received, causing right door upper rack 502c and right door lower rack 502d to slide to the right within slide tracks 510a and 510b, respectively. Right door upper rack 502c engages upper gear 504, which engages left door upper rack 502a, causing left door upper rack 502a to slide to the left. Similarly, right door lower rack 502d engages lower gear 524, which engages left door lower rack 202b, causing left door lower rack 502b to also slide to the left, thus causing left door 402 to move to the left. In other words, a single action to open one door causes the other door to open simultaneously.

Upon reaching a particular sliding distance, pivot gear 422c and pivot gear 422d of right door 404 engage right upper pivot rack 550c and right lower pivot rack 550d, respectively. By engaging with right upper pivot rack 550c, which is fixed with respect to the computer system housing, pivot gear 422c pivots right door 404 around right upper pivot rack 550c and towards the right side of the computer system housing. Similarly, by engaging with right lower pivot rack 550d, which is fixed with respect to the computer system housing, pivot gear 422d pivots right door 404 around right upper pivot rack 550d and towards the right side of the computer system housing. Moreover, the pivoting of left door 402 towards the left side of the computer system housing is accomplished when pivot gears of left door 402 engage left upper pivot rack 550a and left lower pivot rack 550b in a similar manner. In other words, a single action to pivot one door causes the other door to pivot simultaneously.

In one embodiment, left door 402 and right door 404 pivot towards the sides of the computer system housing. In one embodiment, left door 402 and right door 404 pivot such that left door 402 is substantially parallel to the left side of the computer system housing and right door 404 is substantially parallel to the right side of the computer system housing.

As described above, the computer system housing (e.g., computer system housing 100 of FIGS. 1 through 3B) is configured to hold the electronic components of a computer system. FIG. 6 is a block diagram of electronic components of an exemplary computer system 600, in accordance with an embodiment of the present invention. In general, computer system 600 includes bus 610 for communicating information, processor 601 coupled with bus 610 for processing information and instructions, random access (volatile) memory (RAM) 602 coupled with bus 610 for storing information and instructions for processor 601, read-only (non-volatile) memory (ROM) 603 coupled with bus 610 for storing static information and instructions for processor 601, data storage device 604 such as a magnetic or optical disk and disk drive coupled with bus 610 for storing information and instructions. In one embodiment, data storage device 604 is configured to be held in a drive bay accessible at opening 150 of FIGS. 2A through 3B.

In one embodiment, computer system 600 comprises an optional user output device such as display device 605 coupled to bus 610 for displaying information to the computer user, an optional user input device such as alphanumeric input device 606 including alphanumeric and function keys coupled to bus 610 for communicating information and command selections to processor 601, and an optional user input device such as cursor control device 607 coupled to bus 610 for communicating user input information and command selections to processor 601. Furthermore, an optional input/output (I/O) device 608 is used to couple computer system 600 onto, for example, a network.

Display device 605 utilized with computer system 600 may be a liquid crystal device, cathode ray tube, or other display device suitable for creating graphic images and alphanumeric characters recognizable to the user. Cursor control device 607 allows the computer user to dynamically signal the two-dimensional movement of a visible symbol (pointer) on a display screen of display device 605. Many implementations of the cursor control device are known in the art including a trackball, mouse, joystick or special keys on alphanumeric input device 606 capable of signaling movement of a given direction or manner of displacement. It is to be appreciated that the cursor control 607 also may be directed and/or activated via input from the keyboard using special keys and key sequence commands. Alternatively, the cursor may be directed and/or activated via input from a number of specially adapted cursor directing devices.

In summary, in its various embodiments, the present invention provides for sliding and pivoting doors of a computer system housing. By applying a single action to open one door of the pair of doors, the other door opens by sliding in the substantially opposite direction. In some embodiments, upon sliding a particular distance, the doors are operable to pivot towards the sides of the computer system housing. Accordingly, the described invention provides for opening a pair of doors using a single action on one of the doors. Moreover, the doors can tuck into the sides of the computer system housing, keeping them out of the way of the user. Furthermore, the described invention is aesthetically pleasing for the user.

It should be appreciated to one skilled in the art that the described invention is not limited to computer system housings, but rather may be utilized in any number of electronic device enclosures, e.g., DVD players, CD players, televisions, etc.

Various embodiments of the present invention, an electronic device enclosure with sliding and pivoting doors, are described herein. While the present invention has been described in particular embodiments, it should be appreciated that the present invention should not be construed as limited by such embodiments, but rather construed according to the following claims.

What is claimed is:

1. An electronic device enclosure comprising:
    an opening for providing access to electronic componentry; and
    a first door and a second door for covering said opening, said first door movably coupled and opposably slidable to said second door such that a single action to open said first door is operable to open said second door by sliding said second door in a substantially opposite direction.

2. The electronic device enclosure of claim 1 wherein said first door and said second door are operable to pivot upon sliding a particular distance such that said first door and said second door are substantially parallel to sides of said electronic device enclosure.

3. The electronic device enclosure of claim 1 further comprising:
    a first rack coupled to said first door;
    a second rack coupled to said second door;
    a gear that is movably engaged to said first rack and said second rack; and
    a slide track for receiving said first rack, said second rack, and said gear;
    wherein a single action to open said first door moves said first rack and is operable to engage said gear such that said second rack moves in said substantially opposite direction for causing said second door to open.

4. The electronic device enclosure of claim 3 wherein said slide track is recessed such that said first rack, said second rack and said gear reside within said slide track such that said slide track, said first rack and said second rack do not extend beyond sides of said electronic device enclosure.

5. The electronic device enclosure of claim 3, further comprising:
    a first pivot gear coupled to said first door; and
    a first pivot rack proximate said slide rack;
    wherein sliding said first door a particular distance engages said first pivot gear with said first pivot rack causing said first door to pivot such that said first door is substantially parallel to a side of said electronic device enclosure.

6. The electronic device enclosure of claim 5, further comprising:
    a second pivot gear coupled to said second door; and
    a second pivot rack proximate said slide rack;
    wherein sliding said second door said particular distance engages said second pivot gear with second first pivot rack causing said second door to pivot such that said second door is substantially parallel to a side of said electronic device enclosure.

7. The electronic device enclosure of claim 1 wherein said electronic device enclosure is a computer system chassis housing.

8. The electronic device enclosure of claim 1 wherein said electronic componentry comprises a disk drive of a computer system.

9. The electronic device enclosure of claim 1 wherein said single action is pulling said first door from a center of said opening to an outer edge of said opening.

10. A computer system chassis housing with sliding and pivoting doors, said computer system chassis housing comprising:
    an opening for providing access to at least one drive bay within said computer system chassis housing; and
    a pair of doors for covering said opening, said pair of doors movably coupled and opposably slidable such that a single action to open one door of said pair of doors is operable to open the other door of said pair of doors, and wherein said pair of doors are operable to pivot upon sliding a particular distance such that in an open position, said pair of doors are substantially parallel to sides of said computer system chassis housing.

11. The computer system chassis housing of claim 10 wherein said pair of doors in said open position tuck into said sides of said computer system chassis housing such that said pair of doors are minimal appendages on said computer system chassis housing.

12. The computer system chassis housing of claim 10 further comprising:
    a first rack coupled to a first door of said pair of doors;
    a second rack coupled to a second door of said pair of doors;
    a gear that is movably engaged to said first rack and said second rack; and
    a slide track for receiving said first rack, said second rack, and said gear;
    wherein said single action to open said first door moves said first rack and is operable to engage said gear such that said second rack moves in said substantially opposite direction for causing said second door to open.

13. The computer system chassis housing of claim 12 wherein said slide track is recessed such that said first rack, said second rack and said gear reside within said slide track such that said slide track, said first rack and said second rack do not extend beyond said sides of said computer system chassis housing.

14. The computer system chassis housing of claim 12, further comprising:
    a first pivot gear coupled to said first door; and
    a first pivot rack proximate said slide rack;
    wherein sliding said first door a particular distance engages said first pivot gear with said first pivot rack causing said first door to pivot such that said first door is substantially parallel to a side of said computer system chassis housing.

15. The computer system chassis housing of claim 14, further comprising:
   a second pivot gear coupled to said second door; and
   a second pivot rack proximate said slide rack;
   wherein sliding said second door said particular distance engages said second pivot gear with second first pivot rack causing said second door to pivot such that said second door is substantially parallel to a side of said computer system chassis housing.

16. An computer system comprising:
   a processor coupled to a bus;
   a memory unit coupled to said bus;
   a disk drive coupled to said bus;
   a computer system housing for housing said processor, said memory unit and said disk drive, said computer system housing comprising:
   an opening for providing access to said disk drive; and
   a first door and a second door for covering said opening, said first door movably coupled and opposably slidable to said second door such that a single action to open said first door is operable to open said second door by sliding said second door in a substantially opposite direction.

17. The computer system of claim 16 wherein said first door and said second door are operable to pivot upon sliding to an open position such that said first door and said second door are substantially parallel to sides of said computer system housing.

18. The computer system of claim 16 further comprising:
   a first rack coupled to said first door;
   a second rack coupled to said second door;
   a gear that is movably engaged to said first rack and said second rack; and
   a slide track for receiving said first rack, said second rack, and said gear;
   wherein a single action to open said first door moves said first rack and is operable to engage said gear such that said second rack moves in said substantially opposite direction for causing said second door to open.

19. The computer system of claim 18 wherein said slide track is recessed such that said first rack, said second rack and said gear reside within said slide track such that said slide track, said first rack and said second rack do not extend beyond sides of said computer system housing.

20. The computer system of claim 18, further comprising:
   a first pivot gear coupled to said first door;
   a second pivot gear coupled to said second door;
   a first pivot rack proximate said slide rack; and
   a second pivot rack proximate said slide rack;
   wherein sliding said first door a particular distance engages said first pivot gear with said first pivot rack causing said first door to pivot such that said first door is substantially parallel to a side of said computer system housing, and wherein sliding said second door said particular distance engages said second pivot gear with second first pivot rack causing said second door to pivot such that said second door is substantially parallel to a side of said computer system housing.

* * * * *

UNITED STATES PATENT AND TRADEMARK OFFICE
CERTIFICATE OF CORRECTION

PATENT NO. : 7,345,886 B2  Page 1 of 1
APPLICATION NO. : 11/096824
DATED : March 18, 2008
INVENTOR(S) : Robert P. Bliven et al.

It is certified that error appears in the above-identified patent and that said Letters Patent is hereby corrected as shown below:

In column 1, line 44, delete "garners" and insert -- gamers --, therefor.

Signed and Sealed this

Eighth Day of July, 2008

JON W. DUDAS
*Director of the United States Patent and Trademark Office*